April 13, 1948.                    W. SCHMID ET AL                    2,439,782
                              STRIPPING MEANS FOR MOLDS
                          Filed Sept. 14, 1944             3 Sheets-Sheet 1

Inventors
WILLIAM SCHMID
W. E. FILLMORE

By Rule and Hoge.
Attorneys

April 13, 1948.  W. SCHMID ET AL  2,439,782
STRIPPING MEANS FOR MOLDS
Filed Sept. 14, 1944  3 Sheets-Sheet 2

Inventors
WILLIAM SCHMID
W. E. FILLMORE
By Rule and Hoge
Attorneys

April 13, 1948.    W. SCHMID ET AL    2,439,782
STRIPPING MEANS FOR MOLDS
Filed Sept. 14, 1944    3 Sheets-Sheet 3

Inventors
WILLIAM SCHMID
W. E. FILLMORE
By Rule and Hoge
Attorneys

Patented Apr. 13, 1948

2,439,782

UNITED STATES PATENT OFFICE 2,439,782

STRIPPING MEANS FOR MOLDS

William Schmid and William E. Fillmore, Toledo, Ohio, assignors to Owens-Illinois Glass Company, a corporation of Ohio Application September 14, 1944, Serial No. 553,994

10 Claims. (Cl. 18—42)

Our invention relates to machines for press molding articles and as herein illustrated, is embodied in an injection molding machine.

An object of the invention is to provide a machine of the type indicated adapted for simultaneously molding a multiplicity of articles and comprising novel means for rapidly stripping the molded articles from the dies or molding elements.

A further object of the invention is to provide a multiple cavity molding apparatus adapted for molding screw-threaded caps and the like, comprising novel means by which the molded articles may be stripped from the molds.

In the art of manufacturing molded articles having molded screw threads or other surface irregularities, as for example, screw-threaded caps used for bottle closures or other purposes, it is customary to provide means for rotating the molding element for unthreading it from the molded article. The present invention provides a novel construction including strippers by which the molded articles are released from the mold by a straight line relative movement of the article and the mold. The molding material may be a thermoplastic or other material having sufficient elasticity and resilience to permit the momentary deformation of the molded article which takes place as it is stripped from the mold. The article immediately resumes its normal shape when released from the mold or forming die.

In stripping molded articles in this manner from the molding plug or die, considerable force is required. A feature of the present invention, as embodied in a multiple mold machine in which a multiplicity of articles are simultaneously molded, relates to the provision of means whereby the articles are stripped from the dies in a plurality of groups in successive stages, thereby distributing the load and thus reducing the amount of power required, and also reducing the strain placed on the die plates.

Other objects of the invention will appear hereinafter.

Referring to the accompanying drawings.

Figure 1:
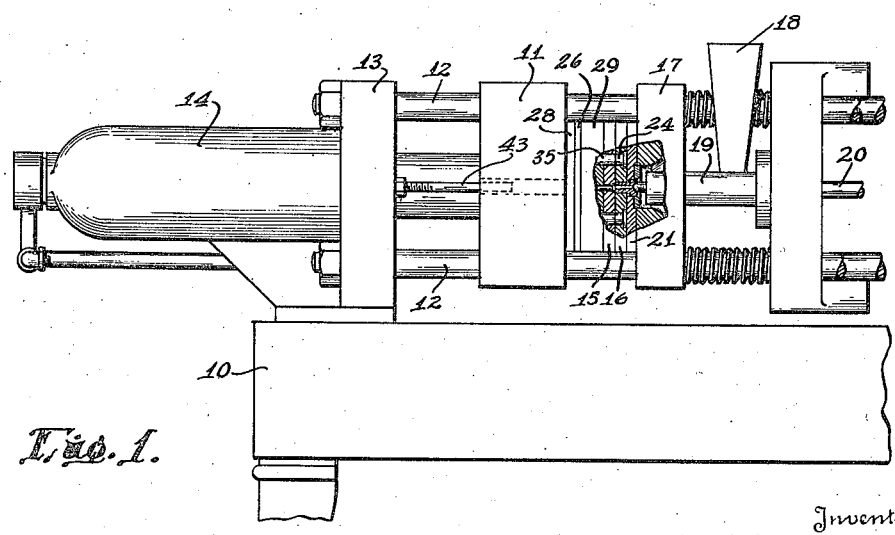
Fig. 1 is an elevation of an injection molding machine constructed in accordance with the present invention, parts being broken away.

Referring particularly to Fig. 1, the machine comprises a stationary base 10 and a die head 11 mounted to reciprocate horizontally on stationary guide rods 12 each secured at one end to a bracket 13 mounted on the base 10, the opposite ends of the guide rods being supported in like manner. The die head 11 is reciprocated by a hydraulic motor 14. Die plates 15 and 16 are mounted respectively on the die head 11 and a die head 17, the latter being slidably supported on the rods 12. Molding material is supplied through a hopper 18 to a heating chamber 19 through which it passes and is forced into the molds by means of an injection apparatus comprising a plunger 20 having a nozzle 20' (Fig. 4).

The machine as thus far described is of the type shown, for example, in the patent to Shaw et al., No. 2,259,781, October 21, 1941, Hydraulic injection molding press, to which reference may be had for more detailed disclosure. Other conventional mechanisms may be employed for injecting the molding material into the molds and for operating the die heads or carriers 11 and 17 on which the die plates and molds are supported.

Figure 3:
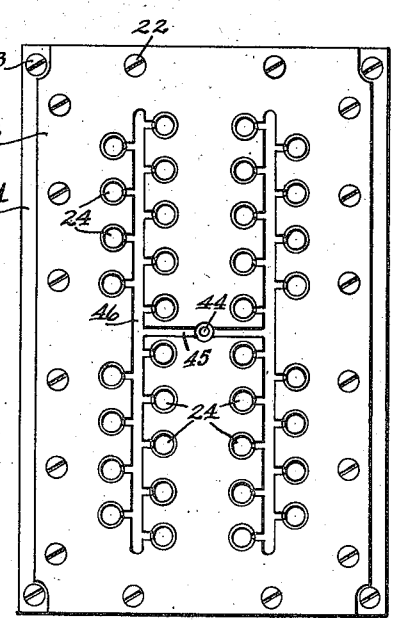
Fig. 3 is a face view of the female die plate.

The die plate 16 is secured to a backing plate 21 (Figs. 3 and 4) by means of screws 22, the plate 21 being attached to the die head 17 by screws 23. A multiplicity of mold sections or female dies 24 are mounted in the plate 16 in alignment with molding plugs 25 or male dies mounted on the die head 11 and projected through openings in the die plate 15. The molding plugs 25, herein referred to as force plugs, are secured in position on the die head by means of a holding plate 26 which engages heads 27 (Fig. 7) formed on the plugs. The heads 27 abut a face plate 28 attached to the carriage by screw bolts 28ª. Spacing blocks 29 are interposed between the plate 26 and the die plate 15, the parts being secured together by screw bolts 31 and 32.

Figure 4:
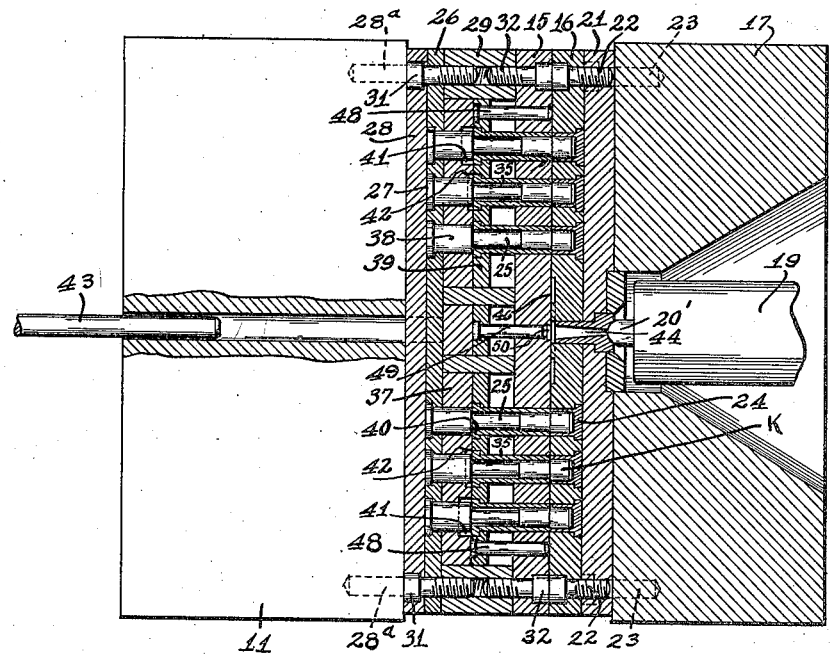
Fig. 4 is an irregular section as indicated by the line 4—4 on Fig. 2, showing the die plates and associated parts, the die plates being together in molding position.
Figure 7:
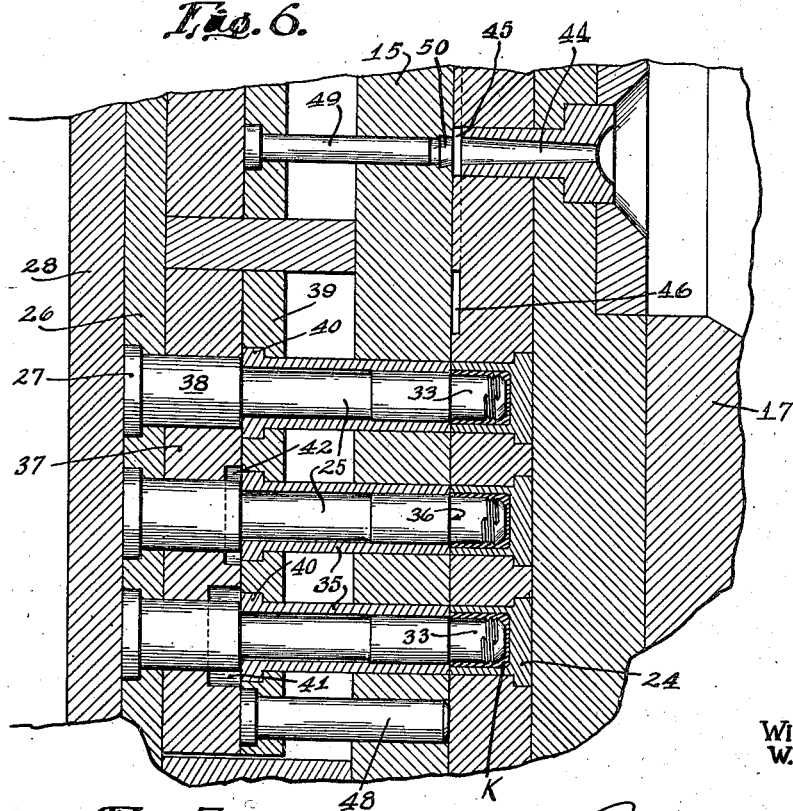
Fig. 7 is a fragmentary sectional view on a comparatively large scale, of part of the mechanism shown in Fig. 4.

When the die plates 15 and 16 are brought together as shown in Figs. 4 and 7, the forward end portions 33 of the plugs project into the dies 24 and serve as molding plugs for shaping the interior surfaces of the molded articles, herein shown as caps K. The plugs 33 are formed with screw threads for molding internal screw threads in the caps.

Mounted on each of the force plugs is a stripping member 35 in the form of a sleeve slidable lengthwise relative to the plug. When the sleeve is fully retracted, (Fig. 7) its forward end is in the meeting plane of the die plates 15 and 16. The end portion 33 of the force plug is of somewhat smaller diameter than the interior diameter of the sleeve, thereby forming a shoulder 36 which is flush with the end of the stripper sleeve and forms therewith the end surface of the mold cavity. The end of the stripper sleeve thus forms an abutment for the molded cap, permitting the latter to be forced off the plug by the relative lengthwise movement of the sleeve and plug as hereinafter described.

The stripper sleeves are operated by an ejector plate 37 mounted between the die plate 15 and the plate 26 and movable forwardly and rearwardly therebetween. Each of the force plugs comprises a section 38 of comparatively large diameter adjoining the head 27 and extending through an opening in the ejector plate 37, the forward end of said enlarged portion being flush with the front face of the ejector plate when the latter is retracted (Fig. 7). A retainer plate 39 bears against the front face of the ejector plate and is fixed to the latter. The stripper sleeves 35 extend through openings in the retainer plate, each sleeve being formed with an end flange or head 40 which the retainer plate engages for retracting the sleeve.

When the die plates are moved apart, the plugs withdraw the molded articles from the dies 24 and during the final movement of the die plate 15, the stripper sleeves 35 strip the molded caps from the plugs. This requires considerable power as the plugs are withdrawn by a straight-line movement which is opposed by each cap owing to its screw-threaded connection with the plug. In order to reduce the power needed for this purpose which is proportional to the number of plugs which are being withdrawn at one time, the mold plugs are segregated into groups and the corresponding stripper sleeves are operated in groups in successive stages.

Figure 2:
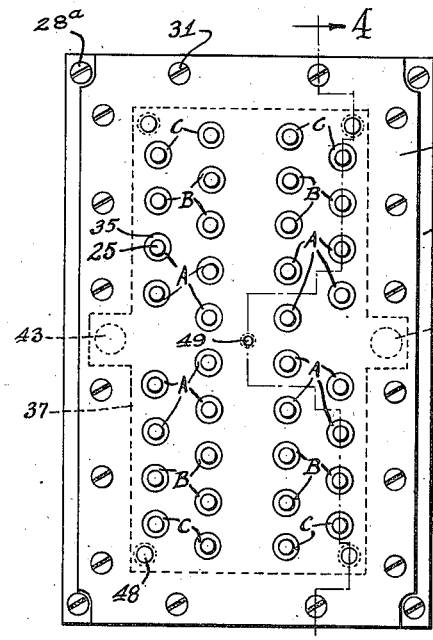
Fig. 2 is a face view of the die plate in which the molding plugs are mounted.

Referring to Fig. 2, the mold units, each including a plug and its stripper sleeve, are divided into three groups designated A, B, and C respectively. It will be noted that group A comprises the units which are nearest the center of the die plates, while the group C includes those which are farthest from the center. As the stripper sleeves of group C exert the greatest moment of force tending to bend the die plate, the number in this group may be less than in the other groups. The ejector plate 37 is formed in its front face with recesses 41 (Fig. 7) or enlargements of the openings through which the plugs of group A extend, thus permitting the ejector plate to move forward a limited distance relatively to the die plate before it engages the heads 40 of the corresponding stripper sleeves. Similar recesses 42 but of less depth are provided in connection with the stripper sleeves of group B. No such recesses are provided for the sleeves of group A. The ejector plate is actuated by a pair of ejector bars 43 which have a fixed mounting in position to engage the ejector plate during the final portion of the retracting movement of the die head 11.

While the die plates are together, molding material is forced from the ejector nozzle through the sprue channel 44 and distributed through branch channels 45 and 46 (Fig. 3) to the mold cavities. The molded articles are all thus united by the runners formed in the said branch channels and removed as a unit from the machine.

Figure 5:
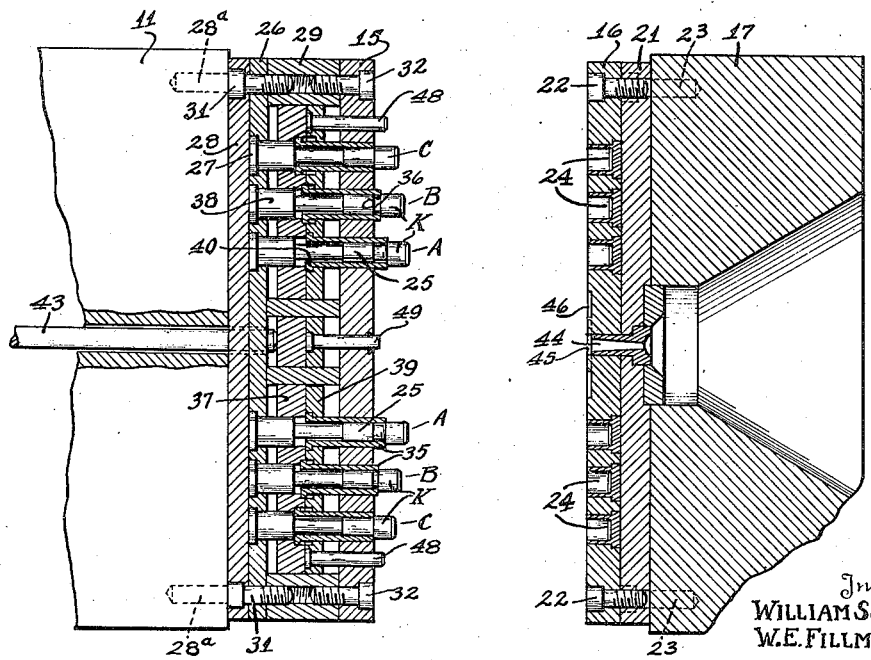
Fig. 5 is a view similar to Fig. 4 but with the die plates separated and the ejector plate in an immediate position.
Figure 6:
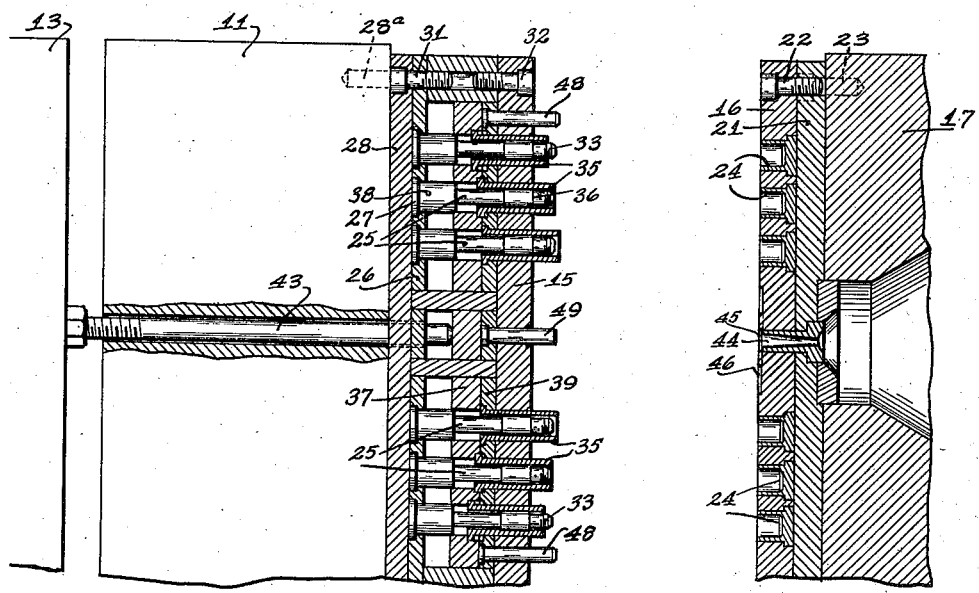
Fig. 6 is a similar view showing the relation of parts when the ejector plate is fully projected.

The operation of removing the molded articles from the dies 24 and stripping them from the plugs is as follows:

After the articles have been molded and the material has set or hardened, the die plates are moved apart, thereby causing the die head 11 to withdraw the force plugs 25 and molded articles thereon from the molds 24. During this movement of the die head 11, the ejector plate 37, carried therewith, remains in its retracted position in contact with the plate 26 until the ejector plate is arrested by contacting the stationary ejector bars 43. The continued movement of the die head 11 then causes a relative shifting of the ejector plate and the die plate. During the first portion of this relative shifting movement, the ejector plate forces the stripper sleeves of group A, to the position shown in Fig. 5, thereby stripping the caps K of said group from the threaded portions of the plugs. During this initial movement of the ejector plate, the heads of the stripper sleeves corresponding to groups B and C, enter the recesses 42 and 41 respectively. Continued movement of the ejector plate then operates the sleeves of group B to strip the caps of said group, this forming the second stripping stage, and finally the sleeves of group C are operated so that when the retracting movement of the die head 11 is completed, all of the molded caps have been stripped or freed from the plugs, permitting the entire set of caps connected by the runners, to be removed in one piece. The flexibility of the material permits the several groups of caps to be stripped in succession as above described, without severing the runners which connect such groups.

As the die plates are brought together, following the removal of the molded caps, the ejector plate 37 is returned to its retracted position by means of pins 48 (Figs. 2 and 7) attached to the ejector plate at the corners thereof. These pins are engaged by the die plate 16 as the die plates are being brought together and thereby force the ejector plate rearwardly. The molds 24 of group A would serve to return the ejector plate in the absence of the pins 48. The latter, however, take the load off the stripper sleeves.

A center pin 49 in alignment with the sprue channel 44 extends through an opening in the die plate 15, said opening having an enlarged portion 50 (Fig. 7). When the die plates are separated the hardened molding material in the enlargement 50 draws the sprue from the channel 44. As the ejector plate is moved forward, the pin 49 is protruded through the die plate and forces the molded material away from the die plate.

Modifications may be resorted to within the spirit and scope of our invention.

We claim:

1. A molding machine comprising a plurality of molding units each including a pair of co-operating molding elements, carriers on which the molding elements of said pairs are respectively mounted, means for withdrawing one said carrier from a molding position and thereby causing the molding elements thereon to withdraw molded articles from the other molding elements, an ejector device mounted on said last mentioned carrier, means for moving said ejector device relative to the carrier on which it is mounted, and stripper devices individual to the molding elements on said last mentioned carrier, said stripper devices being mounted separately from the ejector device for individual movement relative thereto and having contact surfaces positioned in the path of said ejector device, said surfaces being in stepped relation to the contacting surface portions of the ejector device and positioned to effect operating engagement of the ejector device with the stripper devices in succession and thereby strip the molded articles in succession from the molding elements.

2. A molding machine comprising a plurality of molding units each including a mold and a cooperating molding plug, a mold carrier on which said molds are mounted, a plug carrier on which said plugs are mounted, means for relatively moving said carriers straight toward and from each other and thereby moving the plugs into and out of a molding position and causing the plugs to withdraw molded articles from the molds when said carriers are moved apart, stripping mechanism for stripping molded articles from said plugs by a relative bodily movement of the articles and plugs in one direction, said stripping mechanism including stripping members, means for supporting the stripping members in a predetermined fixed position relative to the plug carrier during said withdrawal of the molded articles from the molds, said stripping members being mounted for stripping movement relative to the plug carrier by which said members strip the molded articles from the plug carriers, and means providing stop surfaces individual to the stripping members and holding the stop surfaces in the path of movement of the stripping members with the plug carrier and in position to engage said stripping members in succession for effecting said stripping movement of the stripping members in succession in a predetermined order of sequence during the continued relative movement of said carriers from each other after the molded articles have been withdrawn from the molds, and thereby stripping molded articles from the plugs in succession.

3. A molding machine comprising a plurality of molding units each including a mold and a cooperating molding plug, a mold carrier on which said molds are mounted, a plug carrier on which said plugs are mounted, means for relatively moving said carriers straight toward and from each other and thereby moving the plugs into and out of a molding position and causing the plugs to withdraw molded articles from the molds when said carriers are moved apart, an ejector mounted on the plug carrier, means for moving the ejector on the plug carrier, strippers operable by movement relative to the plug carrier to strip the molded articles from the plugs, and means for maintaining the strippers in a predetermined position relative to the plug carrier during said withdrawal of the molded articles from the molds, said ejector having surface portions individual to and in the path of the strippers and in stepped relation thereto, the said strippers being positioned to be engaged in succession by said surface portions of the ejector and operated in succession thereby during the said movement of the ejector.

4. A molding machine comprising a plurality of molding units each including a mold and a cooperating molding plug, a mold carrier on which said molds are mounted, a plug carrier on which said plugs are mounted, means for relatively moving said carriers straight toward and from each other and thereby moving the plugs into and out of a molding position and causing the plugs to withdraw molded articles from the molds when said carriers are moved apart, an ejector plate mounted on the plug carrier and shiftable relative thereto in the direction of movement of said carrier, means for effecting said shifting of the ejector plate, and strippers individual to said plugs and positioned to be engaged and operated by said stripper plate during its said movement, the plug contacting surfaces of the stripper plate being positioned at different distances from and in stepped relation to the cooperating surfaces of the plugs, whereby the molded articles are stripped from the plugs in succession.

5. The combination of a carrier, molding plugs mounted thereon, stripper sleeves slidably mounted on the plugs, an ejector plate mounted on the carrier for movement relative thereto in a direction lengthwise of the plugs, said plate having sleeve engaging surfaces spaced at different distances from the stripper sleeves and positioned to engage said sleeves in succession during said movement of the ejector plate and thereby operating said sleeves in succession and stripping molded articles from said plugs in succession.

6. The combination of a carrier, groups of molding elements mounted on the carrier, strippers individual to said molding elements, and an ejector mounted on said carrier for reciprocating movement relative to the carrier toward and from the strippers, said strippers being positioned in the path of said ejector and the ejector having its stripper contacting surfaces positioned at different distances from the groups of strippers and in stepped relation thereto while the ejector is in its retracted position, whereby the groups of strippers are operated in succession by said ejector during said movement of the latter and thereby strip the groups of molded articles in successive stages from the molding elements.

7. Molding apparatus comprising a support, a multiplicity of molding plugs having a fixed mounting on said support with the plugs parallel and in spaced relation, strippers individual to and mounted on said plugs for sliding movement lengthwise of the plugs, and an ejector plate mounted on said support for reciprocating movement relative thereto in a direction lengthwise of the plugs, said ejector plate having contact surfaces in position to be brought into contact with the ends of the plugs during said shifting movement of the ejector plate, said contact surfaces being positioned at different distances from said ends of the plugs and in stepped relation thereto in position to contact with groups of the strippers in succession and thereby strip groups of molded articles in succession from the plugs.

8. Molding apparatus comprising a support, a multiplicity of molding plugs having a fixed mounting on said support with the plugs parallel and in spaced relation, strippers individual to and mounted on said plugs for sliding movement lengthwise of the plugs, and an ejector plate mounted on said support for reciprocating movement relative thereto in a direction lengthwise of the plugs, said ejector plate being positioned behind the said strippers, the inner ends of said strippers being substantially in the plane of the front face of said ejector plate, said plate having recesses opposite the said ends of certain of the strippers to receive said ends as the ejector plate is moved forwardly relatively to said support and thereby causing the strippers to be operated in succession during said forward movement of the ejector plate.

9. Molding apparatus comprising a support, a multiplicity of molding plugs having a fixed mounting on said support with the plugs parallel and in spaced relation, strippers individual to and mounted on said plugs for sliding movement lengthwise of the plugs, and an ejector plate mounted on said support for reciprocating movement relative thereto in a direction lengthwise of the plugs, said ejector plate being positioned behind the said stripper, the inner ends of said strippers being substantially in the plane of the front face of said ejector plate, said plate having recesses in its front face arranged in groups corresponding to and opposite groups of said strippers to receive the ends of said strippers as the ejector plate is moved forward, said groups of recesses being of different depths, whereby said groups of strippers are operated in successive stages.

10. An injection molding machine comprising a pair of die plates having meeting faces, a plurality of molding units each comprising a cavity mold mounted in one of said plates and a cooperating molding plug mounted in the other die plate in a position to project into the mold cavity, means for injecting molding material into the molds, means for withdrawing the plug-carrying die plate and causing molded articles to be withdrawn from the mold cavities by the said plugs, strippers individual to the plugs and mounted thereon for movement lengthwise thereof, an ejector plate mounted for movement with the plug-carrying die plate as the latter is withdrawn, means for arresting the ejector plate during said movement of the die plate and thereby causing a forward shifting of the ejector plate relative to the die plate, said strippers being positioned in the path of the ejector plate and spaced at different distances from the contacting surfaces of the ejector plate, whereby during said shifting movement of the ejector plate, the strippers are operated in succession.

WILLIAM SCHMID.
WILLIAM E. FILLMORE.

REFERENCES CITED

The following references are of record in the file of this patent:

UNITED STATES PATENTS

| Number | Name | Date |
|---|---|---|
| 1,916,692 | Scribner | July 4, 1933 |
| 2,013,320 | Shank et al. | Sept. 3, 1935 |
| 2,111,857 | Jeffery | Mar. 22, 1938 |
| 2,225,672 | Webb | Dec. 24, 1940 |